US012654350B2

(12) United States Patent
Tazian et al.

(10) Patent No.: US 12,654,350 B2
(45) Date of Patent: Jun. 16, 2026

(54) METHOD AND SYSTEM FOR FORMING A SURGICAL PILLOW

(71) Applicant: Envirolite, LLC, Troy, MI (US)

(72) Inventors: Vatche Tazian, Troy, MI (US); Kasey Robinson, Coldwater, MI (US)

(73) Assignee: Envirolite, LLC, Troy, MI (US)

( * ) Notice: Subject to any disclaimer, the term of this patent is extended or adjusted under 35 U.S.C. 154(b) by 172 days.

(21) Appl. No.: 18/743,908

(22) Filed: Jun. 14, 2024

(65) Prior Publication Data

US 2025/0381698 A1 Dec. 18, 2025

(51) Int. Cl.

| | |
|---|---|
| ***B26D 3/00*** | (2006.01) |
| ***A61G 13/12*** | (2006.01) |
| ***B26D 5/00*** | (2006.01) |
| ***B26F 1/40*** | (2006.01) |

(52) U.S. Cl.

CPC ........... *B26D 3/006* (2013.01); *A61G 13/121* (2013.01); *B26F 1/40* (2013.01); *B26D 5/005* (2013.01)

(58) Field of Classification Search

CPC ...... B26D 3/006; B26D 5/005; A61G 13/121; B26F 1/40

See application file for complete search history.

(56) References Cited

U.S. PATENT DOCUMENTS

| | | | | | |
|---|---|---|---|---|---|
| 2,709,435 | A * | 5/1955 | Kress | A61G 7/0755 | 604/293 |
| 3,009,848 | A * | 11/1961 | Werner | B26D 3/006 | 428/167 |
| 3,179,317 | A * | 4/1965 | Voelker | B26D 3/006 | 26/13 |
| 3,402,232 | A * | 9/1968 | De Rusha | B26D 3/006 | 83/869 |
| 3,491,631 | A * | 1/1970 | Skinner | B26D 3/006 | 83/612 |
| 3,694,831 | A * | 10/1972 | Treace | A47G 9/10 | 5/636 |
| 3,803,960 | A * | 4/1974 | Pearl | B26D 5/005 | 83/76.4 |
| 4,688,285 | A * | 8/1987 | Roberts | A61G 7/05723 | 5/630 |
| 5,018,231 | A * | 5/1991 | Wang | A47G 9/10 | 5/636 |
| 5,269,035 | A * | 12/1993 | Hartunian | A47C 20/026 | 5/639 |
| 5,301,587 | A * | 4/1994 | Blaimschein | B26D 7/086 | 83/870 |
| 5,396,903 | A * | 3/1995 | Pruitt | A61G 7/072 | 5/636 |
| 5,826,873 | A * | 10/1998 | Lavermicocca | B26F 3/12 | 273/157 R |

(Continued)

*Primary Examiner* — Sean M Michalski
(74) *Attorney, Agent, or Firm* — Quinn IP Law

(57) ABSTRACT

A method and system for fabricating a disposable free-standing surgical pillow is described and includes employing a contour cutting machine to form lateral notches, profile portions and base portions in an intermediate workpiece, wherein the profile portions include opposed side support portions and a medial notch. A die cut press executes through-cuts and partial cuts to form medial cutout portions. At least one lateral cut and at least one longitudinal cut are executed to separate the intermediate workpiece into a plurality of individual workpieces in the form of the surgical pillows.

20 Claims, 5 Drawing Sheets

(56) References Cited

U.S. PATENT DOCUMENTS

| | | | | | |
|---|---|---|---|---|---|
| 6,032,669 | A * | 3/2000 | Klein | A47C 20/021 | 128/845 |
| D438,046 | S * | 2/2001 | Palm | D6/601 | |
| 6,427,272 | B1 * | 8/2002 | Yacoub | A61G 7/07 | 5/639 |
| 6,842,924 | B1 * | 1/2005 | Walters | A47C 20/026 | 5/636 |
| 8,006,335 | B1 * | 8/2011 | Andermann | A61G 7/07 | 5/632 |
| 8,549,683 | B2 * | 10/2013 | Ratner | A61G 13/121 | 128/845 |
| 8,850,641 | B2 * | 10/2014 | Marbury, III | A47G 9/1054 | 5/643 |
| 9,289,344 | B2 * | 3/2016 | Pi | A61G 13/1235 | |
| 9,308,147 | B2 * | 4/2016 | Davis | A61G 13/121 | |
| 10,842,285 | B1 * | 11/2020 | Glass | A47C 20/021 | |
| 11,013,336 | B2 * | 5/2021 | Langer | A61F 5/01 | |
| D968,622 | S * | 11/2022 | Robran | D24/190 | |
| 2003/0017772 | A1 * | 1/2003 | Sloot | D06N 7/0092 | 428/81 |
| 2011/0167972 | A1 * | 7/2011 | Gilliver | B29C 44/5627 | 83/176 |
| 2013/0205504 | A1 * | 8/2013 | Ratner | A61G 13/121 | 5/622 |
| 2014/0359944 | A1 * | 12/2014 | Thompson | A61G 13/1285 | 5/636 |
| 2018/0345517 | A1 * | 12/2018 | Boscari | B26D 1/505 | |

* cited by examiner

METHOD AND SYSTEM FOR FORMING A SURGICAL PILLOW

INTRODUCTION

In many examples during surgery and/or convalescence, a patient may have to rest in the face-down, or prone, position or the face-up, or supine, position. It would be desirable to have a surgical pillow to provide comfortable support to the patient in both positions, and one which is cost-effective and disposable with each use to reduce possible patient cross-contamination.

SUMMARY

There is a need for an improved surgical pillow for supporting a patient in either a prone position or a supine position on a table during or after a medical procedure, and a method for manufacturing such a surgical pillow.

The concepts describe herein provide, in one embodiment, a method for fabricating a low-cost, disposable free-standing surgical pillow from a single piece of resilient foam, wherein the surgical pillow may be advantageously employed in a surgical environment or a convalescent environment. The surgical pillow is configured to support a head of a patient in either a prone position or a supine position. Features of the surgical pillow may include a unitary resilient body that is formed from a compressible foam material for holding and cushioning the head and face of a patient.

The resilient body of the surgical pillow has a cavity formed in the upper portion for receiving, positioning, holding, and cushioning the head and face of a patient. The resilient body has access openings therein for additional apparatus, such as an endotracheal tube, and to permit viewing of the patient's face during surgery. The surgical pillow described herein may be employed to support the patient in the prone position while allowing medical personnel to monitor the patient's face and any lines and tubes that may be inserted into the patient's nose and mouth. The medical personnel are able to monitor the patient without altering the patient's position, The patient's facial area may be located over an aperture allowing it to be viewed from below and also allowing diagnostic, monitoring and life support equipment to be provided to the patient through the face, mouth and nose.

An aspect of the disclosure includes a method for fabricating a surgical pillow to accommodate a head of a patient. The method includes arranging a prismatic foam block on a table surface, the prismatic foam block defining a lateral (x) axis, a longitudinal (y) axis, and an elevation (z) axis. In one embodiment, the prismatic foam block is fabricated from polyurethane. A contour cutting machine may be employed to execute a first through-cut in the prismatic foam block orthogonal to a yz-plane to form a plurality of lateral notches, and a plurality of second through-cuts in the prismatic foam block orthogonal to the yz-plane and orthogonal to an xy-plane to form a plurality of identical first columns. The contour cutting machine executes a third through-cut in the prismatic foam block orthogonal to an xz-plane to form a plurality of profile portions and a plurality of base portions, wherein each of the plurality of profile portions includes opposed side support portions and a medial notch. The contour cutting machine executes a plurality of fourth through-cuts in the prismatic foam block orthogonal to the xz-plane and orthogonal to the xy-plane to subdivide the plurality of identical first columns into a plurality of identical second columns. The plurality of identical second columns are separated into a plurality of identical intermediate workpieces, wherein each of the identical intermediate workpieces includes a unitary piece having the base portion and the profile portion. A die cut press executes a plurality of through-cuts in the xy-plane of the intermediate workpieces to form a plurality of medial cutout portions in the plurality of base portions, and executes a plurality of first partial cuts in the xy-plane in the intermediate workpieces to form a plurality of opposed side cutout portions in the plurality of profile portions. A second partial vertical cut is executed in the xy-plane in the intermediate workpiece to form nose-mouth (NM) cutout portions in the plurality of profile portions. At least one lateral cut and at least one longitudinal cut are executed to separate the intermediate workpiece into a plurality of individual workpieces in the form of surgical pillows.

Another aspect of the disclosure includes executing the at least one lateral cut in the xz-plane and executing the at least one longitudinal cut in the yz-plane to separate the intermediate workpiece into the plurality of individual workpieces, wherein each of the individual workpieces includes the base portion and the profile portion. The profile portion has one of the plurality of lateral notches, one of the plurality of medial notches, one of the plurality of opposed side support portions having one of the opposed side cutout portions, and one of the medial cutout portions.

Another aspect of the disclosure includes continuously executing, via the contour cutting machine, a first cut pattern to form the plurality of notches.

Another aspect of the disclosure includes rotating the prismatic foam block by 90 degrees prior to executing the third through-cut orthogonal to the xz-plane to form the plurality of profile portions.

Another aspect of the disclosure includes the third through-cut orthogonal to the xz-plane to form a plurality of profiles being a second cut pattern to form the plurality of profiles.

Another aspect of the disclosure includes each of the plurality of profiles includes a pair of opposed right trapezoidal elements defining a medial notch.

Another aspect of the disclosure includes executing the first partial cut orthogonal to the xz-plane and parallel to the yz-plane to form a slit between a portion of the base portion and the profile portion.

Another aspect of the disclosure includes removing excess material from each of the intermediate workpieces.

Another aspect of the disclosure includes each of the plurality of intermediate workpieces having a profile portion arranged on top of a prismatic base portion, wherein executing the plurality of first partial cuts in the xy-plane in the intermediate workpieces to form the plurality of side support portions includes executing the plurality of first partial cuts in the xy-plane in the intermediate workpieces to completely penetrate the profile portion.

Another aspect of the disclosure includes executing a plurality of through-cuts in the xy-plane in the intermediate workpieces to form a plurality of medial cutout portions includes executing a complete depth cut in the xy-plane to penetrate through the foam material in each of the intermediate workpieces.

Another aspect of the disclosure includes executing a plurality of partial cuts in the xy-plane in the intermediate workpieces to penetrate through only a portion of the foam material in each of the intermediate workpieces.

Another aspect of the disclosure includes simultaneously executing the plurality of through-cuts and the plurality of first partial cuts in the xy-plane to simultaneously form the plurality of medial cutout portions and the plurality of side support portions in the plurality of intermediate workpieces.

Another aspect of the disclosure includes executing, via the die cut press, a plurality of circular through-cuts in the xy-plane in the intermediate workpieces to form a plurality of circular medial cutout portions in the plurality of base portions.

Another aspect of the disclosure includes executing, via the die cut press, a plurality of semi-circular partial cuts in the xy-plane in the intermediate workpieces to form a plurality of opposed semi-circular side cutout portions in the plurality of profile portions.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
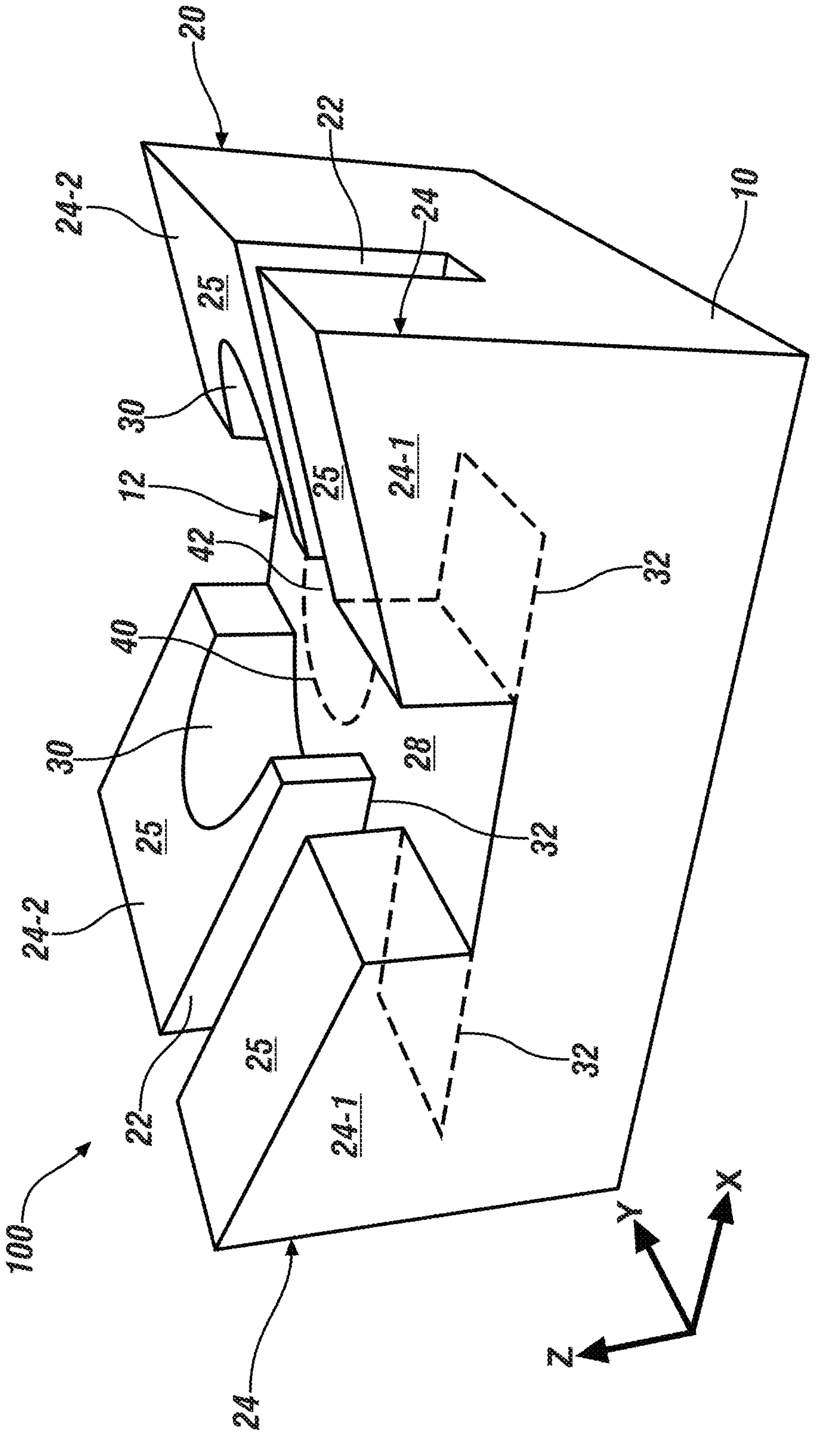
FIG. 1 schematically illustrates a top-front isometric view of a free-standing surgical pillow fabricated from a single piece of resilient foam, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. The use of ordinals such as first, second and third does not necessarily imply a ranked sense of order, but rather may only distinguish between multiple instances of an act or structure.

For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein. It should be understood that throughout the drawings, corresponding reference numerals indicate like or corresponding parts and features.

Referring now to the drawings, which are provided for the purpose of illustrating certain exemplary embodiments only and not for the purpose of limiting the same, FIG. 1 schematically illustrates a top-front isometric view of a free-standing surgical pillow 100 that has been fabricated from a single piece of resilient foam, such as an open-cell foam material. The surgical pillow 100 is designed to enable proper head positioning of a patient after surgery where parts of the body need to remain elevated for extended periods of time, especially during sleep. This may include the patient resting with their head in an elevated position, either on their back or with their face down in a prone position.

The surgical pillow 100 is described herein with reference to a lateral or x-axis (X), a longitudinal or y-axis (Y), and an elevation or z-axis (Z). The x-axis, y-axis, and z-axis define an xy-plane, a yz-plane, and an xz-plane. The surgical pillow 100 includes a base portion 10 and a profile portion 20. As described herein, a CNC contour cutting machine 400 (described with reference to FIG. 4), a punch press (not shown), and process 500 (described with reference to FIGS. 5, 6, and 7) are elements of a system that is employable to fabricate an embodiment of the free-standing surgical pillow 100 from a single piece of resilient foam.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality. For the sake of brevity, conventional components and techniques and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the disclosure.

Referring again to FIG. 1, the profile portion 20 of the surgical pillow 100 is arranged as a pair of opposed side support portions 24 that define a medial notch 12 and opposed lateral notches 22.

The opposed side support portions 24 of the profile portion 20 are subdivided into first profile subportions 24-1 and second profile subportions 24-2, which are delineated by the opposed lateral notches 22. The opposed side support portions 24 are each configured as right trapezoidal elements in the yz-plane, with each having a hypotenuse side 25 that slopes downward toward the medial notch 12. The base portion 10 is arranged as a rectangular prism in one embodiment, and defines a medial cutout portion 28. Slits 32 are formed in the xy-plane between a portion of the base portion 10 and a portion of the profile portion 20.

The second profile subportions 24-2 of the profile portion 20 define a first pair of opposed side cutout portions 30, which are semi-circular in one embodiment. The first pair of opposed side cutout portions 30 may be formed via die cutting, as described herein.

The second profile subportions 24-2 of the profile portion 20 define a first pair of opposed side cutout portions 30, which are semi-circular in one embodiment.

A nose/mouth (NM) cutout portion 40 is formed in the base portion 10, and is selectively removable. The NM cutout portion 40 has a circular cross-section resulting in a cylindrical arrangement in one embodiment. Alternatively, the NM cutout portion 40 may have another cross-sectional arrangement. The NM cutout portion 40 may be formed via a partial die cutting in the form of a kiss cut by way of a non-limiting example, so that the remaining piece 42 may be retained within the NM cutout portion 40, or may be removed from the NM cutout portion 40, depending on the needs of the patient. The partial die cutting may be in the form of a partial depth cut around the entire circumference of the NM cutout portion 40 in one embodiment. Alternatively, the partial die cutting may be in the form of a complete depth cut around only a portion of the circumference of the NM cutout portion 40 in one embodiment.

Figure 2:
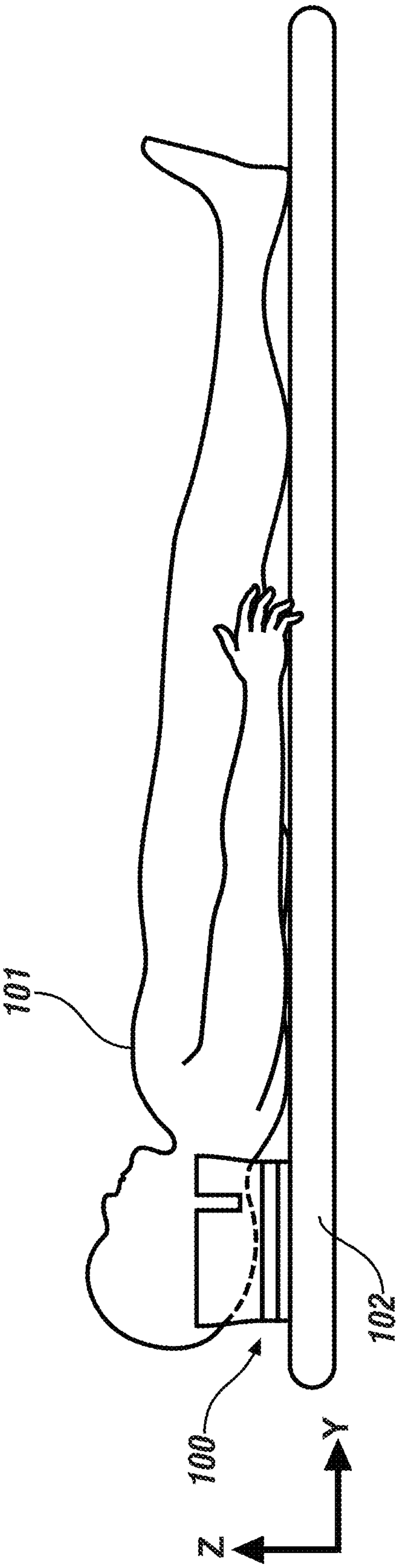
FIG. 2 pictorially illustrates a side view of a patient arranged in a supine position on a table employing an embodiment of the surgical pillow described with reference to FIG. 1, in accordance with the disclosure.

FIG. 2 pictorially illustrates a side view of a patient 101 arranged in a supine position or face-up position on a table 102 employing an embodiment of the surgical pillow 100 described with reference to FIG. 1.

Figure 3:
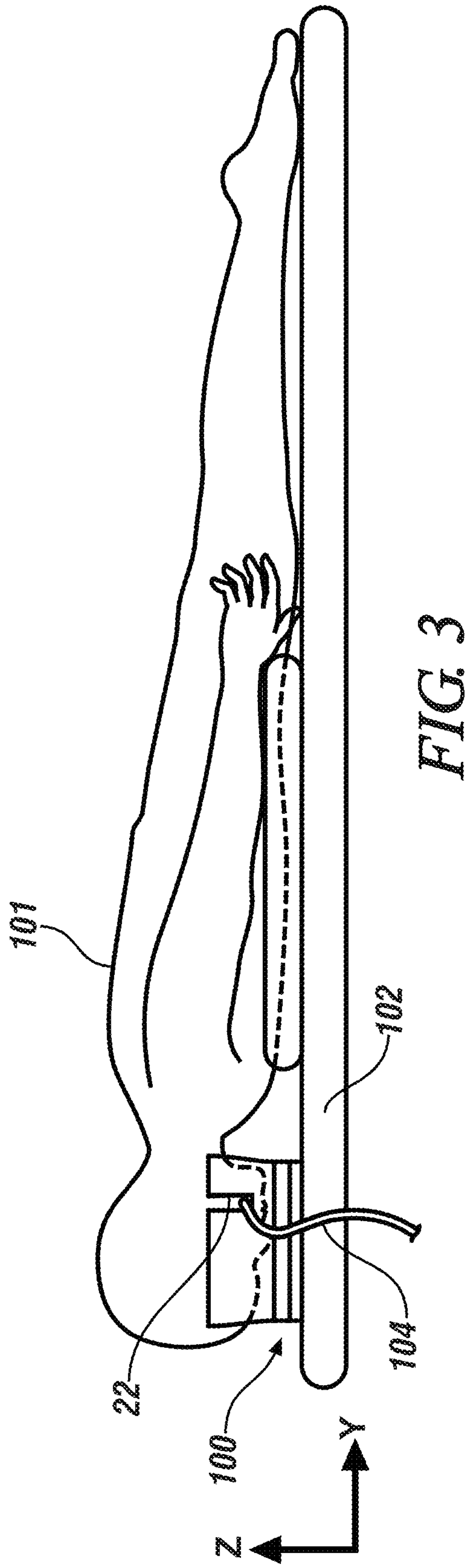
FIG. 3 pictorially illustrates a side view of a patient arranged in a prone position on a table employing an embodiment of the surgical pillow described with reference to FIG. 1, in accordance with the disclosure.

FIG. 3 pictorially illustrates a side view of a patient 101 arranged in a prone position or face-down position on table 102 employing an embodiment of the surgical pillow 100 described with reference to FIG. 1, along with an intubation tube 104 that passes through lateral notch 22.

Figure 4:
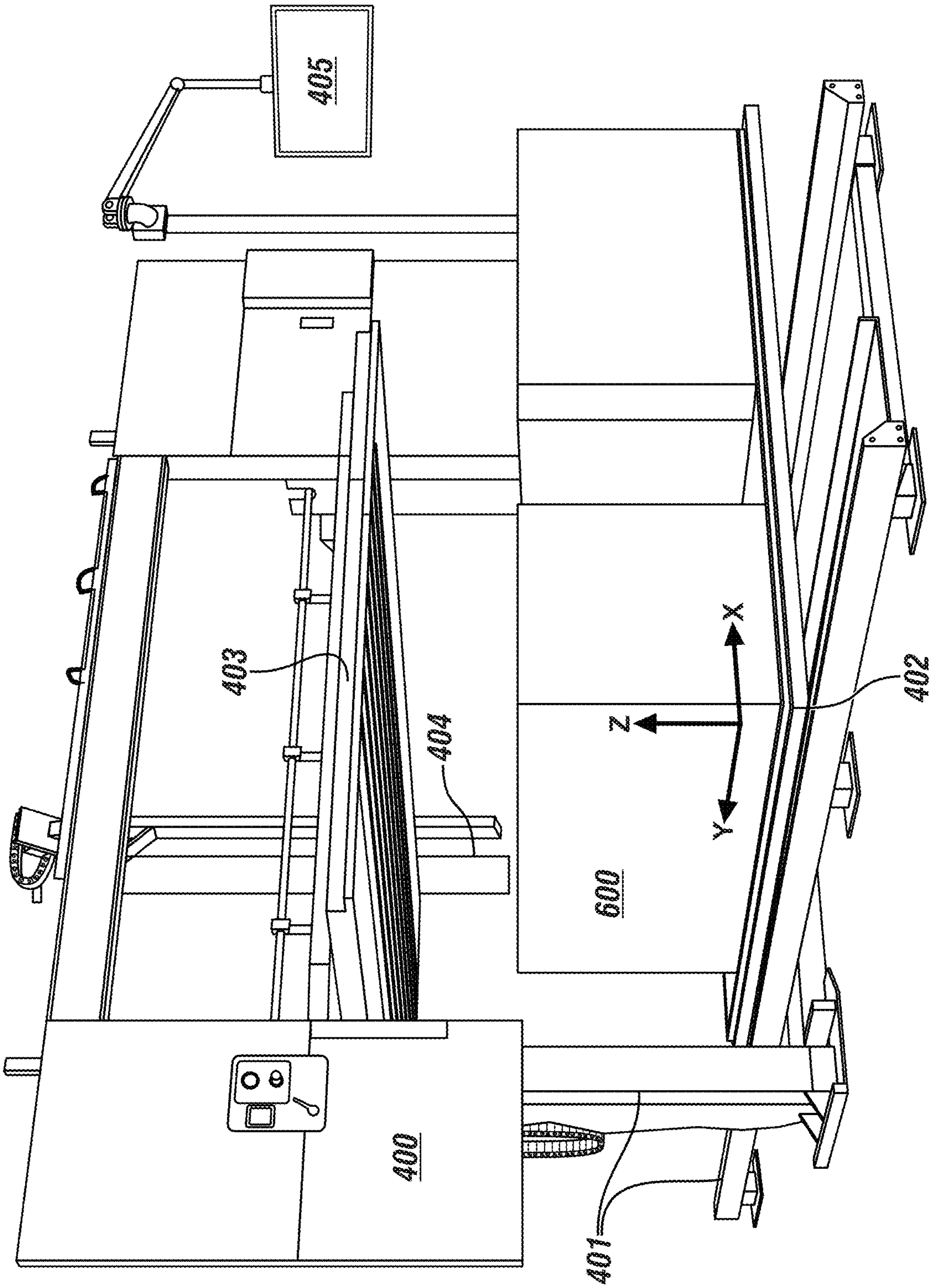
FIG. 4 pictorially illustrates a CNC-controlled contour cutting machine and prismatic foam block, in accordance with the disclosure.

FIG. 4 pictorially illustrates an embodiment of a computer numerical control (CNC) contour cutting machine 400 for cutting a workpiece in the form of a unitary prismatic foam block 600 in a manner described herein. The main elements of the CNC contour cutting machine 400 include a stationary frame 401, a workpiece table 402, a movable cutting-element carrier 403, an endless cutting element 404, and a controller 405.

The controller 405 controls the position of the workpiece table 402 in relation to the x-axis and the y-axis, and hence controls the position of the prismatic foam block 600. The controller 405 also controls the position of the endless cutting element 404 in relation to the y-axis and the z-axis. The controller 405 controls the position of the table 402 and prismatic foam block 600, which may be displaced at precise speeds and directions in the y-direction. The controller 405 simultaneously controls the position of the cutting element 404, which may be displaced at precise speeds and directions in the z-direction. By controlling the speeds and directions of the table 402 and the cutting element 404, it is possible for any desired curve or contour to be followed.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

Figure 5:
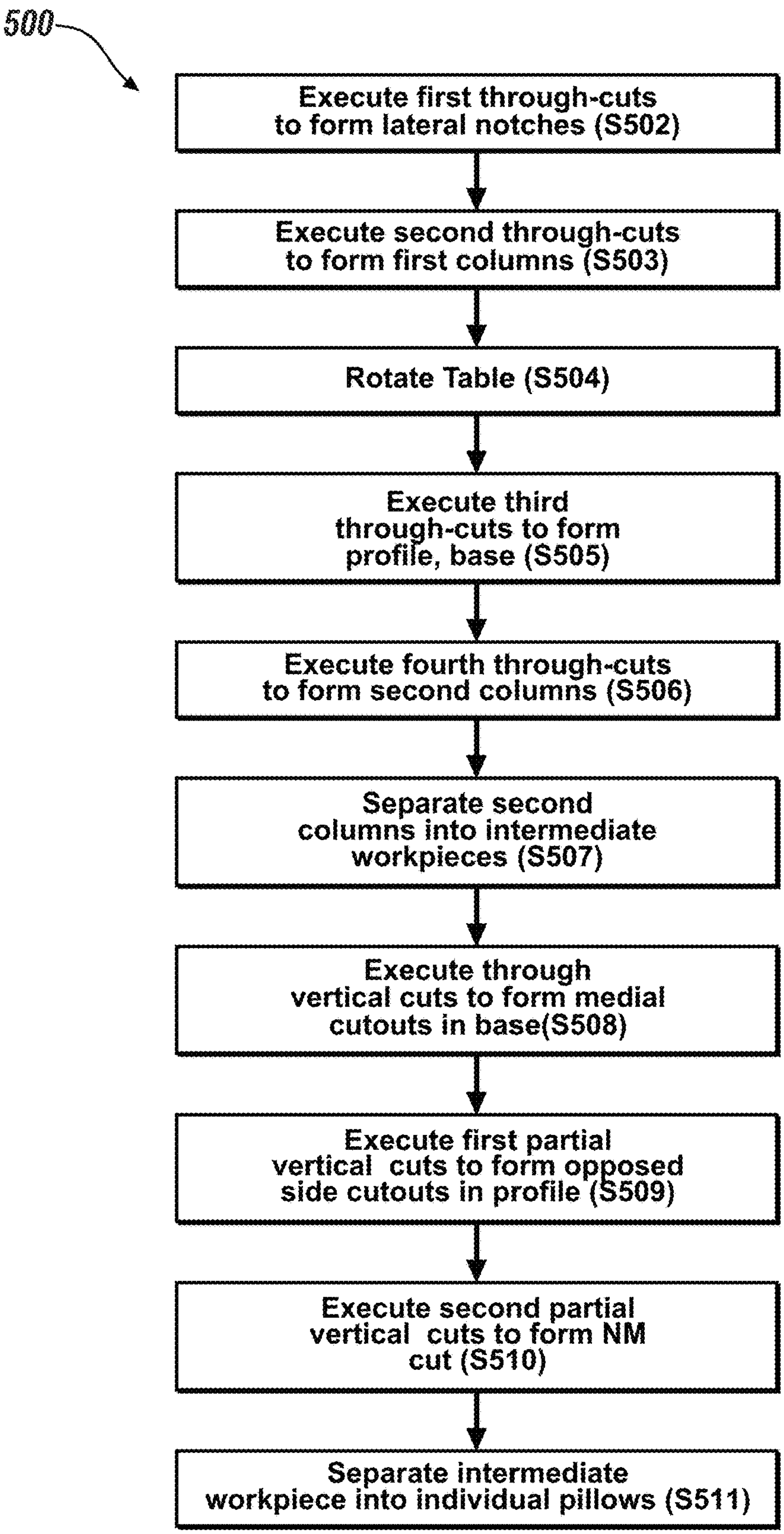
FIG. 5 schematically illustrates a process for forming embodiments of the surgical pillow described with reference to FIG. 1 employing an embodiment of the CNC-controlled contour cutting machine described with reference to FIG. 4, in accordance with the disclosure.

FIG. 5 schematically illustrates a pillow-forming process 500 for forming an embodiment of the surgical pillow 100 described with reference to FIG. 1 employing an embodiment of the CNC-controlled contour cutting machine 400 described with reference to FIG. 4. The surgical pillow 100 is described herein with reference to the lateral or x-axis, the longitudinal or y-axis, and the elevation or z-axis. The x-axis, y-axis, and z-axis define the xy-plane, the yz-plane, and the xz-plane.

Examples of an embodiment of a prismatic foam block 600 having various through-cuts, columns, layers, notches, etc. that are described with reference to the pillow-forming process 500 are illustrated with reference to FIG. 6.

The pillow-forming process 500 includes arranging and securing an embodiment of the prismatic foam block 600 onto the table 402 of the contour cutting machine 400, with the xy-plane of the prismatic foam block 600 arranged to face the cutting element 404, as illustrated with reference to FIG. 4.

Referring again to FIG. 6, the contour cutting machine 400 controls the cutting element carrier 404 to execute a first plurality of through-cuts 601 in the prismatic foam block 600 orthogonal to the yz-plane to form a plurality of the lateral notches 22 in the prismatic foam block 600. In one embodiment, and as shown, the contour cutting machine 400 controls the cutting element carrier 404 to execute the first plurality of through-cuts 601 to form eight of the lateral notches 22 in each of eleven layers 611 in the prismatic foam block 600 (S502).

The contour cutting machine 400 next controls the cutting element carrier 404 to execute a second plurality of through-cuts 602 in the prismatic foam block 600 that are orthogonal to the yz-plane and orthogonal to the xy-plane to form a plurality of first columns 612 having identical dimensions (S503).

The contour cutting machine 400 next rotates the table 402 by 90 degrees, thus rotating the prismatic foam block 600 by 90 degrees (S504).

The contour cutting machine 400 next controls the cutting element carrier 404 to execute a third plurality of through-cuts 603 in the prismatic foam block 600 to form a plurality of profile portions 20 and a plurality of the base portions 10, wherein each of the plurality of profile portions 20 includes the opposed side support portions 24 that define the medial notch 12 (S505).

In one embodiment, and as shown, the contour cutting machine 400 controls the cutting element carrier 404 to execute the third plurality of through-cuts 603 to form nine of the profile portions 20 and base portions 10 in each of the eleven layers 611 in the prismatic foam block 600.

Figure 6:
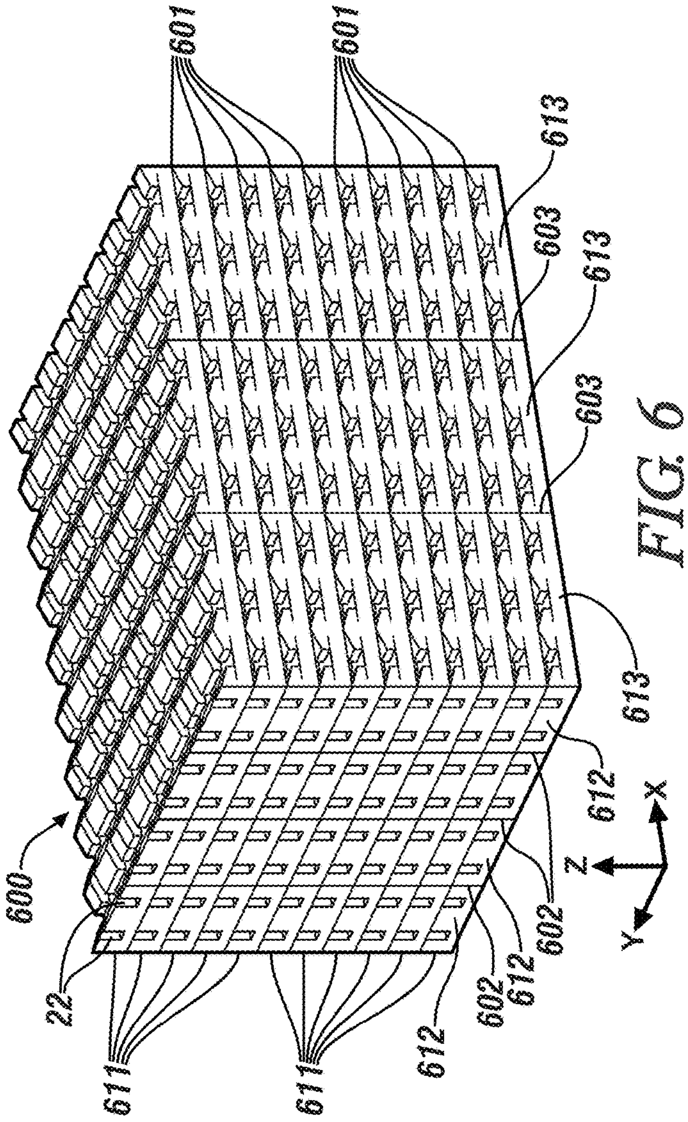
FIG. 6 pictorially illustrates an isometric view of a partially cut prismatic foam block, in accordance with the disclosure.
Figure 7:
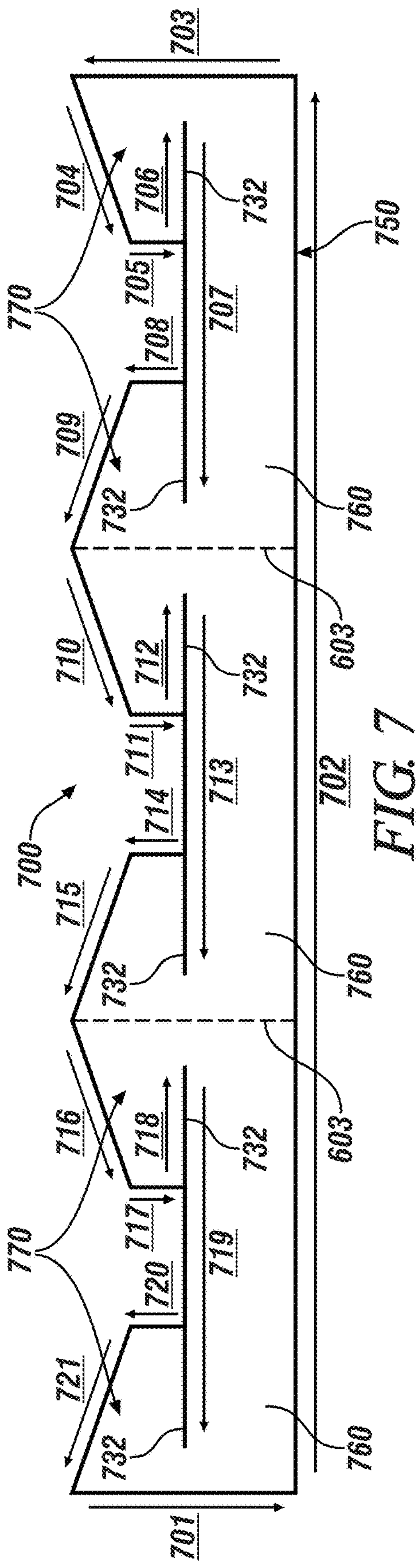
FIG. 7 schematically illustrates a side-view of an intermediate workpiece for forming an embodiment of a free-standing surgical pillow fabricated from a single piece of resilient foam, in accordance with the disclosure.

FIG. 7, with continued references to the surgical pillow 100 of FIG. 1 and elements of FIGS. 4, 5, and 6, schematically illustrates a two-dimensional end view of an intermediate workpiece 750, and depicts a 21-step cut pattern 700 that is executed by the cutting element carrier 404 of the contour cutting machine 400 to form the profile portions 770 and base portions 760 in one workpiece 750 that is formed in each of the eleven layers 611 in the prismatic foam block 600. The 21-step cutting pattern 750 is depicted as a quantity of 21 sequentially executed vertical, horizontal, and angled cuts, and is illustrated as steps 701 through 721. The 21-step cut pattern 700 creates, defines, and encompasses an outer surface of the intermediate workpiece 750. The 21-step cutting pattern 700 includes sequentially executed horizontal, vertical and angled cuts that define profile portions 770, base portions 760, slits 732 in the intermediate workpiece 750. The 21-step cutting pattern 700 includes vertical downward cut 701, horizontal rightward cut 702, vertical upward cut 703, angled left-down cut 704, vertical downward cut 705, horizontal rightward cut 706, horizontal leftward cut 707, vertical upward cut 708, angled right-up cut 709, and then repeats with angled left-down cut 710, vertical downward cut 711, horizontal rightward cut 712, horizontal leftward cut 713, vertical upward cut 714, angled right-up cut 715, and angled left-down cut 716, vertical downward cut 717, horizontal rightward cut 718, horizontal leftward cut 719, vertical upward cut 720, and angled right-up cut 721, which returns to the point of origin for cut 701.

Referring again to FIG. 4, the contour cutting machine 400 controls the cutting element carrier 404 to execute a fourth plurality of through-cuts 604 in the prismatic foam block 600 that are orthogonal to the xz-plane and orthogonal to the xy-plane to subdivide the plurality of first columns 612 into a plurality of second columns 613 that are identically dimensioned (S506). In one embodiment and as shown, the fourth plurality of through-cuts 604 in the prismatic foam block 600 includes two through-cuts that are orthogonal to the xz-plane and orthogonal to the xy-plane to subdivide each of the four first columns 612 into three second columns 613 that are identically dimensioned.

FIG. 6 schematically illustrates a workpiece that represents the prismatic foam block 600 after having been subjected to steps S501, S502, S503, S504, S505, and S506.

The plurality of identical second columns 613 are each separated into a plurality of the intermediate workpieces 750 that are identically shaped in each dimension. Each of the intermediate workpieces 750 includes a unitary piece having an intermediate base portion 760 and an intermediate profile portion 770 (S507).

Each of the intermediate workpieces 750 is inserted into a CNC die cut press to execute vertical through-cuts in the intermediate base portion 760 to form a plurality of medial cutouts in the intermediate base portion 760 (S508).

Each of the intermediate workpieces 750 is inserted into the CNC die cut press to execute first partial vertical cuts in the intermediate profile portion 770 to form a plurality of opposed side cutouts 30 in the intermediate profile portion 770 (S509). An example of the opposed side cutouts 30 is depicted with reference to FIG. 1.

Referring again to FIG. 5, each of the intermediate workpieces 750 is inserted into the CNC die cut press to execute second partial vertical cuts, e.g., kiss-cuts, in the intermediate profile portion 770 to form the NM cutout portions 40 in the intermediate profile portion 770 (S510). An example of the NM cutout portion 40 is depicted with reference to FIG. 1. Kiss cutting is a shallow cutting method employing a die tool to cut a top or upper portion of the material, leaving a lower portion of the material unpenetrated or partially penetrated, and thus uncut. In one embodiment, some portion(s) of the material of the intermediate workpiece 750 associated with the NM cutout portion 40 may be completely cut through, with a remaining portion being left uncut. This allows the NM cutout portions 40 to be retained in the intermediate workpiece 750 or removed in-service, depending on the needs of the patient. The kiss cut may be performed by a rotary tool, a flat bed tool, a laser machine press, or another cutting tool.

Referring again to FIG. 5, each of the intermediate workpieces 750 is separated into a plurality of individual workpieces in the form of the surgical pillow 100 that is illustrated with reference to FIG. 1 by executing at least one lateral cut and executing at least one longitudinal cut thereon (S511). In one embodiment, this includes executing one lateral cut and executing two longitudinal cuts in each of the intermediate workpieces 750 to form the surgical pillow 100 that is described with reference to FIG. 1.

The pillow-forming process 500 described herein advantageously provides a low-cost, disposable free-standing surgical pillow for supporting a patient in either a prone position or a supine position on a table during or after a medical procedure, or in a convalescent environment.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A method for fabricating a surgical pillow, the method comprising:

arranging a prismatic foam block on a table surface, the prismatic foam block defining a lateral (x) axis, a longitudinal (y) axis, and an elevation (z) axis;

executing, via a contour cutting machine, a first through-cut in the prismatic foam block orthogonal to a yz-plane to form a plurality of lateral notches;

executing, via the contour cutting machine, a plurality of second through-cuts in the prismatic foam block orthogonal to the yz-plane and orthogonal to an xy-plane to form a plurality of identical first columns;

executing, via the contour cutting machine, a third through-cut in the prismatic foam block orthogonal to an xz-plane to form a plurality of profile portions and a plurality of base portions, wherein each of the plurality of profile portions includes an opposed side support portion defining a medial notch;

executing, via the contour cutting machine, a plurality of fourth through-cuts in the prismatic foam block orthogonal to the xz-plane and orthogonal to the xy-plane to subdivide the plurality of identical first columns into a plurality of identical second columns;

separating the plurality of identical second columns into a plurality of identically shaped intermediate workpieces, wherein each of the intermediate workpieces includes a unitary piece having one of the plurality of base portions and one of the plurality of profile portions;

executing, via a die cut press, a plurality of through-cuts in the xy-plane in the intermediate workpieces to form a plurality of medial cutouts in the plurality of base portions;

executing, via the die cut press, a plurality of first partial cuts in the xy-plane in the intermediate workpieces to form a plurality of opposed side cutout portions in the plurality of profile portions;

executing a second partial vertical cut in the xy-plane in the intermediate workpiece to form nose-mouth (NM) cutout portions in the plurality of profile portions; and executing at least one lateral cut and executing at least one longitudinal cut to separate the intermediate workpiece into a plurality of individual workpieces.

2. The method of claim 1, comprising executing the at least one lateral cut in the xz-plane and executing the at least one longitudinal cut in the yz-plane to separate the intermediate workpiece into the plurality of individual workpieces, wherein each of the individual workpieces includes:

one of the plurality of base portions; and one of the plurality of profile portions.

3. The method of claim 1, wherein executing, via the contour cutting machine, the first through-cut orthogonal to the yz-plane to form the plurality of lateral notches comprises executing, continuously, a first cut pattern to form the plurality of lateral notches.

4. The method of claim 1, further comprising rotating the prismatic foam block by 90 degrees prior to executing the third through-cut orthogonal to the xz-plane to form the plurality of profile portions.

5. The method of claim 1, wherein executing the third through-cut orthogonal to the xz-plane to form the plurality of profile portions comprises executing, continuously, a second cut pattern to form the plurality of profile portions.

6. The method of claim 5, wherein each of the plurality of profile portions includes a pair of opposed right trapezoidal elements defining the medial notch.

7. The method of claim 5, wherein executing, continuously, the second cut pattern to form the plurality of profile portions includes executing a partial cut orthogonal to the xz-plane and parallel to the yz-plane to form a slit between a portion of the base portion and the profile portion.

8. The method of claim 1, wherein executing, via the die cut press, the plurality of partial cuts in the xy-plane in the intermediate workpieces to form the plurality of opposed side cutout portions in the plurality of profile portions comprises executing the plurality of partial cuts in the xy-plane in the intermediate workpieces to completely penetrate the plurality of profile portions.

9. The method of claim 1, wherein executing a plurality of through-cuts in the xy-plane in the intermediate workpieces to form a plurality of medial cutout portions comprises executing a complete depth cut in the xy-plane to penetrate through material in each of the intermediate workpieces.

10. The method of claim 1, wherein executing a plurality of partial cuts in the xy-plane in the intermediate workpieces to form a plurality of side support portions comprises executing a partial depth cut in the xy-plane to penetrate through only a portion of material in each of the intermediate workpieces.

11. The method of claim 10, further comprising simultaneously executing, via the die cut press, the plurality of through-cuts and the plurality of partial cuts in the xy-plane to simultaneously form the plurality of medial cutouts and the plurality of side support portions in each of the plurality of intermediate workpieces.

12. The method of claim 1, comprising executing, via the die cut press, a plurality of circular through-cuts in the xy-plane in the intermediate workpieces to form a plurality of circular medial cutout portions in the plurality of base portions.

13. The method of claim 1, comprising executing, via the die cut press, a plurality of semi-circular partial cuts in the xy-plane in the intermediate workpieces to form a plurality of opposed semi-circular side cutout portions in the plurality of profile portions.

14. A method for fabricating a surgical pillow, the method comprising:

arranging a prismatic foam block on a table surface, the prismatic foam block defining a lateral (x) axis, a longitudinal (y) axis, and an elevation (z) axis;

executing, via a contour cutting machine, a first through-cut in the prismatic foam block orthogonal to a yz-plane to form a plurality of lateral notches;

executing, via the contour cutting machine, a plurality of second through-cuts in the prismatic foam block orthogonal to the yz-plane and orthogonal to an xy-plane to form a plurality of identical first columns;

executing, via the contour cutting machine, a third through-cut in the prismatic foam block orthogonal to an xz-plane to form a plurality of profile portions and a plurality of base portions, wherein each of the plurality of profile portions includes an opposed side support portion defining a medial notch;

separating a plurality of intermediate workpieces, wherein each of the plurality of intermediate workpieces is a unitary piece having the base portion and the profile portion, and wherein the plurality of intermediate workpieces are identically shaped;

executing, via a die cut press, a plurality of through-cuts in the xy-plane in the plurality of intermediate workpieces to form a plurality of lateral notches in the plurality of base portions;

executing, via the die cut press, a plurality of first partial cuts in the xy-plane in the plurality of intermediate workpieces to form a plurality of opposed side cutout portions in the plurality of profile portions;

executing a second partial vertical cut in the xy-plane in the plurality of intermediate workpieces to form a plurality of nose-mouth (NM) cutout portions in the plurality of profile portions; and executing at least one lateral cut and executing at least one longitudinal cut to separate the plurality of intermediate workpieces into a plurality of individual workpieces.

15. The method of claim 14, comprising executing the at least one lateral cut in the xz-plane and executing the at least one longitudinal cut in the yz-plane to separate the plurality of intermediate workpieces into the plurality of individual workpieces, wherein each of the individual workpieces includes:

the base portion including a medial cutout portion; and the profile portion having one of the plurality of lateral notches, one of the medial notches, and one of the opposed side support portions having one of the opposed side cutout portions.

16. The method of claim 14, wherein executing, via the contour cutting machine, a first through-cut orthogonal to a yz-plane to form a plurality of lateral notches comprises executing, continuously, a first cut pattern to form the plurality of lateral notches.

17. The method of claim 14, further comprising rotating the prismatic foam block by 90 degrees prior to executing the third through-cut orthogonal to the xz-plane to form the plurality of profile portions.

18. The method of claim 14, wherein executing the third through-cut orthogonal to the xz-plane to form a plurality of profile portions comprises executing, continuously, a second cut pattern to form the plurality of profile portions, wherein each of the plurality of profile portions includes a pair of opposed right trapezoidal elements defining the medial notch.

19. The method of claim 18, wherein executing, continuously, the second cut pattern to form the plurality of profile portions includes executing the first partial cut orthogonal to the xz-plane and parallel to the yz-plane to form a slit between a portion of the base portion and the profile portion.

20. A system for fabricating a surgical pillow, the system comprising:

a contour cutting machine, a die cut press, and a controller;

wherein the controller is operatively connected to the contour cutting machine and the die cut press;

wherein the contour cutting machine and the die cut press are arranged to act upon a prismatic foam block disposed on a table surface, the prismatic foam block defining a lateral (x) axis, a longitudinal (y) axis, and an elevation (z) axis;

the controller including algorithmic code that is executable to:

execute, via the contour cutting machine, a first through-cut in the prismatic foam block orthogonal to a yz-plane to form a plurality of lateral notches;

execute, via the contour cutting machine, a plurality of second through-cuts in the prismatic foam block orthogonal to the yz-plane and orthogonal to an xy-plane to form a plurality of identical first columns;

execute, via the contour cutting machine, a third through-cut in the prismatic foam block orthogonal to an xz-plane to form a plurality of profile portions and a plurality of base portions, wherein each of the plurality of profile portions includes an opposed side support portion defining a medial notch;

separate a plurality of identical intermediate workpieces, wherein each of the identical intermediate workpieces includes a unitary piece having the base portion and the profile portion;

execute, via the die cut press, a plurality of through-cuts in the xy-plane in the intermediate workpieces to form a plurality of medial notches in the plurality of base portions;

execute, via the die cut press, a plurality of first partial cuts in the xy-plane in the intermediate workpieces to form a plurality of opposed side cutout portions in the plurality of profile portions;

execute, via the die cut press, a second partial vertical cut in the xy-plane in the intermediate workpiece to form nose-mouth (NM) cutout portions in the plurality of profile portions; and execute at least one lateral cut and execute at least one longitudinal cut to separate the intermediate workpiece into a plurality of individual workpieces.

* * * * *